United States Patent
Zhou

(10) Patent No.: US 9,716,766 B2
(45) Date of Patent: Jul. 25, 2017

(54) METHOD AND DISTRIBUTED SYSTEM SERVER FOR INSTANT INFORMATION PUSH

(71) Applicant: Taixing Zhihan Technology Co., Ltd., Taixing (CN)

(72) Inventor: Qiang Zhou, Beijing (CN)

(73) Assignee: TAIXING ZHIHAN TECHNOLOGY CO., LTD., Taizhou (CN)

( * ) Notice: Subject to any disclaimer, the term of this patent is extended or adjusted under 35 U.S.C. 154(b) by 155 days.

(21) Appl. No.: 14/837,689

(22) Filed: Aug. 27, 2015

(65) Prior Publication Data

US 2017/0041416 A1  Feb. 9, 2017

(30) Foreign Application Priority Data

Aug. 6, 2015 (CN) .......................... 2015 1 0478544

(51) Int. Cl.
*G06F 17/30* (2006.01)
*H04L 29/08* (2006.01)
*H04L 29/12* (2006.01)

(52) U.S. Cl.
CPC .............. *H04L 67/26* (2013.01); *G06F 17/30* (2013.01); *G06F 17/30017* (2013.01);
(Continued)

(58) Field of Classification Search
CPC ............... G06F 17/30; G06F 17/30861; G06F 17/30017; G06F 17/30244;
(Continued)

(56) References Cited

U.S. PATENT DOCUMENTS

| 2004/0078750 A1* | 4/2004 | Frank ................. G06F 17/3087 715/256 |
| 2008/0235190 A1 | 9/2008 | Zhao |
| 2010/0005424 A1* | 1/2010 | Sundaresan ....... G06F 17/30259 715/849 |

(Continued)

FOREIGN PATENT DOCUMENTS

| CN | 103093366 | 5/2013 |
| CN | 103095753 | 5/2013 |
| CN | 103150628 | 6/2013 |
| CN | 103368902 | 10/2013 |

*Primary Examiner* — Le H Luu
(74) *Attorney, Agent, or Firm* — Harness, Dickey & Pierce, P.L.C.

(57) ABSTRACT

The present disclosure discloses a method and a distributed system server for instant information push in a network information service, wherein the method comprises: sending distributed information to a proxy server and transferring it onto a distributed-information server, by an information distribution user; sending information in need to the proxy server and transferring it onto an information-in-need server, by an information-needs user; storing and synchronizing in real-time, by the proxy server, an IP address, a category list, and a tag list of the distributed-information server and the information-in-need server; receiving the information in need, searching for a tag group, looking for a match in the distributed-information server, and sending a match result; and receiving the distributed information, searching for a tag group, looking for a match in the information-in-need server, and sending a match result. The present disclosure also discloses a corresponding distributed system server. Thus, the present disclosure provides a system that promptly acquires useful information once the information is distributed, while the system avoids risk of failing to work by a distributed storage when suffering from a malfunction or being under attack.

12 Claims, 8 Drawing Sheets

Figure 1A:
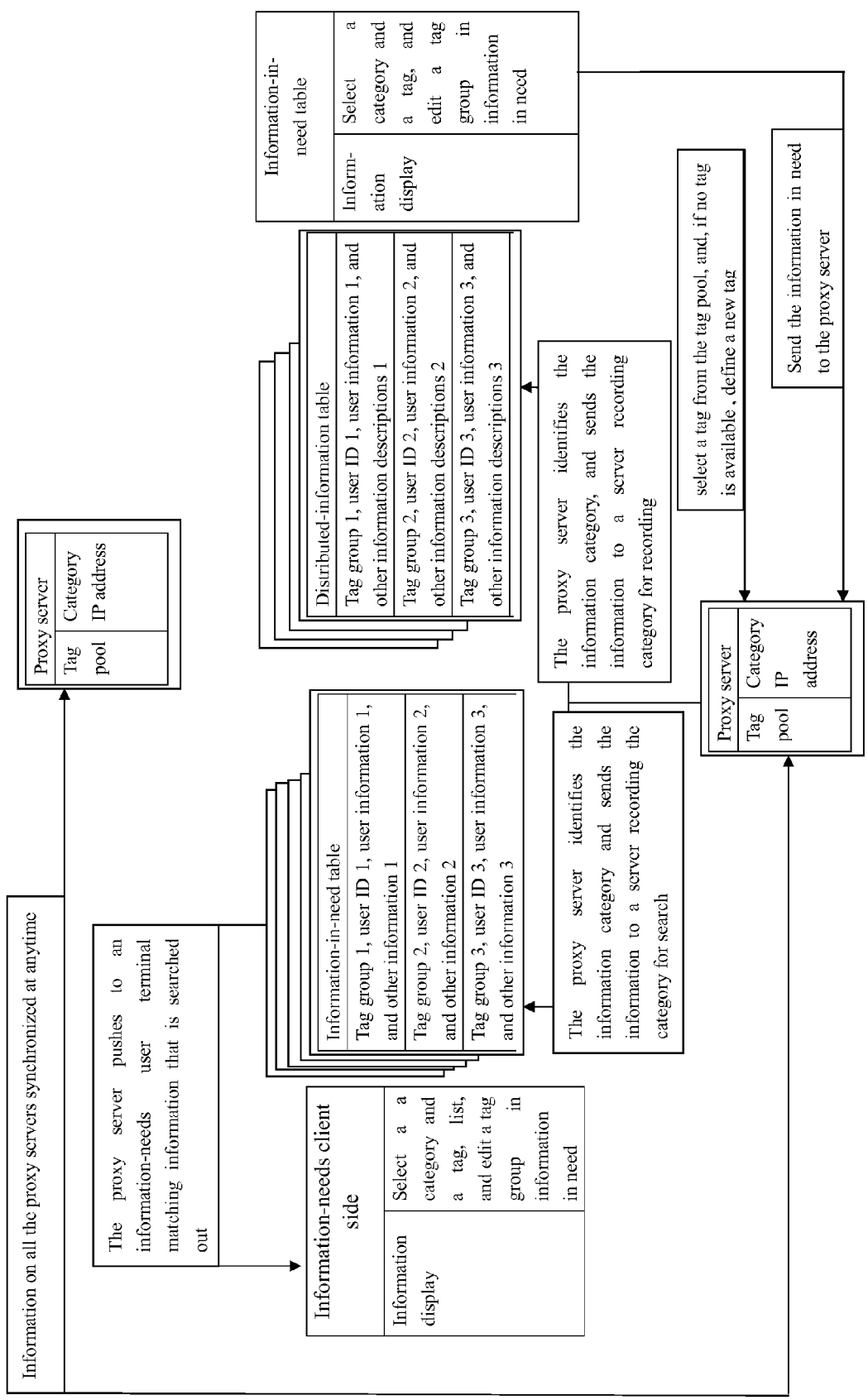

(52) U.S. Cl.
CPC .... *G06F 17/30067* (2013.01); *G06F 17/3074* (2013.01); *G06F 17/30244* (2013.01); *G06F 17/30781* (2013.01); *G06F 17/30861* (2013.01); *H04L 61/2007* (2013.01); *H04L 67/1095* (2013.01); *H04L 67/1097* (2013.01); *H04L 67/28* (2013.01); *H04L 61/6013* (2013.01)

(58) Field of Classification Search
CPC ........... G06F 17/30781; G06F 17/3074; G06F 17/30067; G06F 17/30035; G06F 17/30259; G06F 17/3087; G06F 8/61; G06Q 20/123; G06Q 30/02; H04L 51/28; H04L 67/322
See application file for complete search history.

(56) References Cited

U.S. PATENT DOCUMENTS

| | | | |
|---|---|---|---|
| 2010/0094878 A1* | 4/2010 | Soroca | G06F 17/30035 707/748 |
| 2012/0036220 A1* | 2/2012 | Dare | G06F 8/61 709/217 |
| 2013/0031172 A1* | 1/2013 | Olsen | H04L 51/28 709/204 |
| 2013/0073473 A1* | 3/2013 | Heath | G06Q 30/02 705/319 |
| 2014/0181187 A1* | 6/2014 | Stevens | H04L 67/322 709/203 |
| 2014/0244488 A1* | 8/2014 | Kim | G06Q 20/123 705/39 |

* cited by examiner

METHOD AND DISTRIBUTED SYSTEM SERVER FOR INSTANT INFORMATION PUSH

CROSS-REFERENCE TO RELATED APPLICATION

This application claims the benefit and priority of Chinese Patent Application No. 201510478544.3 filed Aug. 6, 2015. The entire disclosure of the above application is incorporated herein by reference.

FIELD

The present disclosure relates to the field of a network information service, in particular, to a method and a distributed system for instant information push in a network information service system.

BACKGROUND

This section provides background information related to the present disclosure which is not necessarily prior art.

Existing network information search services, including search engines and electronic commerce websites, are flooded by a significant amount of spams, nevertheless, information which is really useful for searchers are buried among the spam information. A facility and a platform capable of accurately searching for information in need are required by the users.

Especially in the field of electronic commerce, commodities and services, not in mass production but produced on a small scale, are buried among a large amount of information about mass-production products with similar keywords. The mass-production products and services are capable of constantly conveying product information over the Internet by virtue of having advantages of production scales, but such information is regarded as spam by users who are searching for a personalized product or a service that is not in mass production. A facility and a platform, capable of accurately searching for products and services that are not in mass production, are required by the users.

The information for the products and services that are not in mass production is timely due to the discontinuity thereof. For example, sale information of a collection is valid to its potential buyers only for a period in which the collection completes its transaction, starting from the sale. Once the transaction has been made, the sale information will be invalid for its potential buyers even if it can be found over the Internet. Meanwhile, an information distributor anticipates that all those who plan to purchase the collection are capable of immediately acquiring it within the term of validity. Additionally, because the information distributor tends to continuously distribute the information of the same type, a person acquiring interested information is likely to expect following other information distributed why the same information distributor. Therefore, a facility, which enables information in need for the users to be sent to them simultaneously when the information is distributed, is desirable for the users, meanwhile, it enables information distributed by the users to be sent to those in need of it simultaneously when the information is distributed. People also are in need of the facility in being capable of continuously following other information distributed by the information distributor.

If the users require some timely information, with the current search methods, it is possible to continuously search for it until it is distributed by someone. Accordingly, a facility, capable of immediately acquiring the useful information when it is distributed, is required.

SUMMARY

This section provides a general summary of the disclosure, and is not a comprehensive disclosure of its full scope or all of its features.

The present disclosure addresses the problem of timely sending to the users who are in need of information of products and services that are not in mass production.

In view of this, the present disclosure provides a method for instant information push in a network information service, including the steps of:

A. sending distributed information to a first proxy server or a plurality of proxy servers via a user terminal, by an information distribution user, where the distributed information includes a category and one or more tags and a data package under the category, which are selected from a category list and a tag list stored in the first proxy server; and the selected tags form a tag group, the data package includes at least a type of a text, an image, or a video, and the distributed information is stored in a storage area of a distributed-information server, which corresponds to the category included in the distributed information;

B. sending information in need to a second proxy server of the plurality of proxy servers via another user terminal, by an information-needs user, where the information in need includes a category and one or more tags under the category, which are selected from the category list and the tag list stored in the second proxy server; and the selected tags form a tag group, and the information in need is stored in a storage area of a information-in-need server, which corresponds to the category included in the information in need;

C. storing, by each of the plurality of proxy servers, an IP addresses, the category lists, and the tag lists of all distributed-information servers and all information-in-need servers and consistently keeping them on with one another;

D. searching in the second proxy server for the IP addresses of one distributed-information servers that include the category, according to the category included in the information in need, and searching for the tag group included in the information in need in one or more distributed-information servers that include the category, if the second proxy server receives the information in need; and sending one or more pieces of distributed information to the user terminal via which the information in need is sent, if the one or more pieces of distributed information are searched out such that the tag group, which is included therein, completely or partially matches the tag group included in the information in need; and E. searching in the first proxy server for the IP addresses of one or more information-in-need servers that include the category, according to the category included in the distributed information, and searching for the tag group included in the distributed information in one or more information-in-need servers that include the category, if the first proxy server receives the distributed information; and sending the distributed information to the user terminals via which one or more pieces of information in need are sent, if the one or more pieces of information in need are searched out such that the tag group, which is included therein, completely or partially matches the tag group included in the distributed information;

where the "completely matches" indicates that all the tags of the tag group included in the distributed information are identical to the respective tags of the tag group included in the information in need, and the "partially matches" indicates that some of the tags of the tag group included in the distributed information are identical to the respective tags of the tag group included in the information in need.

Preferably, if the second proxy server receives the information in need and one or more pieces of distributed information are searched out in the one or more distributed-information servers that include the category included in the information in need such that the tag group, which is included therein, completely or partially matches the tag group included in the information in need, it sends the information in need to the user terminals via which the one or more pieces of distributed information are sent; and if the first proxy server receives the distributed information and one or more information in need is searched out in one or more pieces of information-in-need servers that include the category included in the distributed information such that the tag group, which is included therein, completely or partially matches the tag group included in the distributed information, it sends the one or more pieces of information in need to the user terminal via which the distributed information is sent.

Preferably, the distributed information is timely information.

Preferably, a category in a category list is sorted by a first letter of a category name, and a tag in the tag list of each category is sorted by times the tag being selected in a descending order.

Preferably, after a category is selected and under which the one or more tags in the tag list are selected by the information-needs user or the information distribution user on his or her user terminal, other tags in the tag list under the category are re-sorted by the number of times the tags being selected in a descending order, under a condition that the one or more tags in the tag list are selected.

Preferably, the information-needs user and the information distribution user define one or more tags, and, if the defined one or more tags are absent in the present tag list, the defined tags are automatically added to the tag list.

The present disclosure further provides a distributed system server for instant information push in a network information service, including at least one proxy server, at least one information-in-need server, and at least one distributed-information server, and the system further includes:

sending distributed information to a first proxy server of the at least a proxy server via a user terminal, by an information distribution user, where the distributed information includes a category and one or more tags and a data package under the category, which are selected from a category list and a tag list stored in the first proxy server; and the selected tags form a tag group, the data package includes at least a type of a text, an image, or a video, and the distributed information is stored in a storage area of the at least one distributed-information server, which corresponds to the category included in the distributed information;

sending information in need to a second proxy server of the at least one proxy servers via another user terminal, by an information-needs user, wherein the information in need includes a category and one or more tags under the category, which are selected from the category list and the tag list stored in the second proxy server; and the selected tags form a tag group, and the information in need is stored in a storage area of the at least one information-in-need server, which corresponds to the category included in the information in need;

storing, by each of the at least one proxy servers, an IP addresses, the category lists, and the tag lists of the at least one distributed-information servers and the at least one information-in-need servers and consistently keeping them on with one another;

searching in the second proxy server for the IP addresses of one or more distributed-information server that includes the category, according to the category included in the information in need, and searching for the tag group included in the information in need in one or more distributed-information server that includes the category, if the second proxy server receives the information in need; and sending one or more pieces of distributed information to the user terminal via which the information in need is sent, if the one or more pieces of distributed information are searched out such that the tag group, which is included therein, completely or partially matches the tag group included in the information in need; and searching in the first proxy server for the IP addresses of one or more information-in-need servers that include the category, according to the category included in the distributed information, and searching for the tag group included in the distributed information in the one or more information-in-need servers that includes the category, if the first proxy server receives the distributed information; and sending the distributed information to the user terminal via which one or more pieces of information in need are sent, if the one or more pieces of information in need are searched out such that the tag group, which is included therein, completely or partially matches the tag group included in the distributed information;

where the "completely matches" indicates that each tag in the tag group included in the distributed information is identical to the respective tag in the tag group included in the information in need, and the "partially matches" indicates that not every tag in the tag group included in the distributed information is identical to the respective tag in the tag group included in the information in need.

Thus, the present disclosure provides the users with a facility, which enables information in need for the users to be sent to them simultaneously when the information is distributed, the facility enables information distributed by the users to be sent to those in need of it simultaneously when the information is distributed. Moreover, a distributed storage in the distributed system for instant information push entails efficient running of the system, while some servers thereof are under attack. Hence, the system security is significantly improved.

Further areas and aspects of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1B:
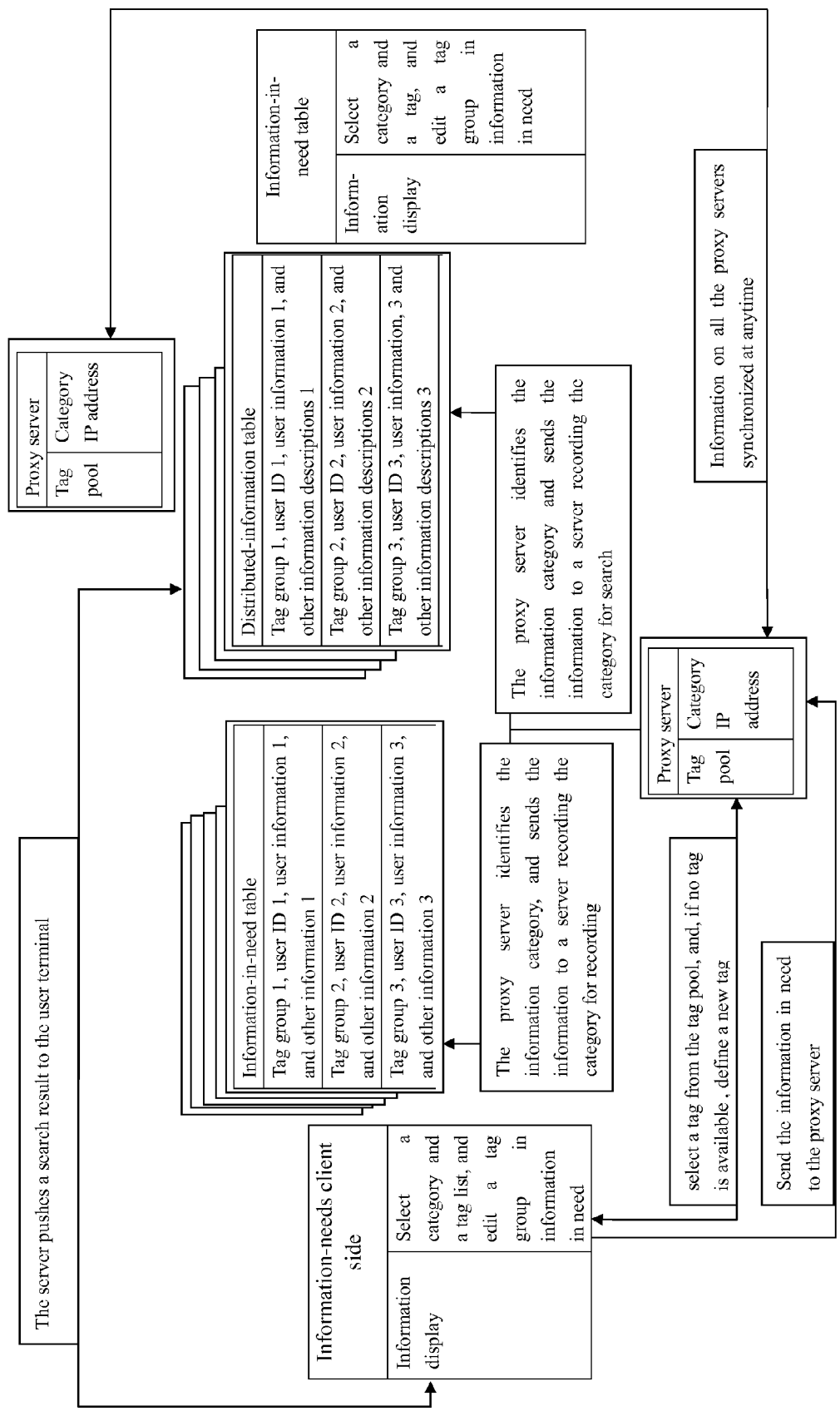
Figure 3:
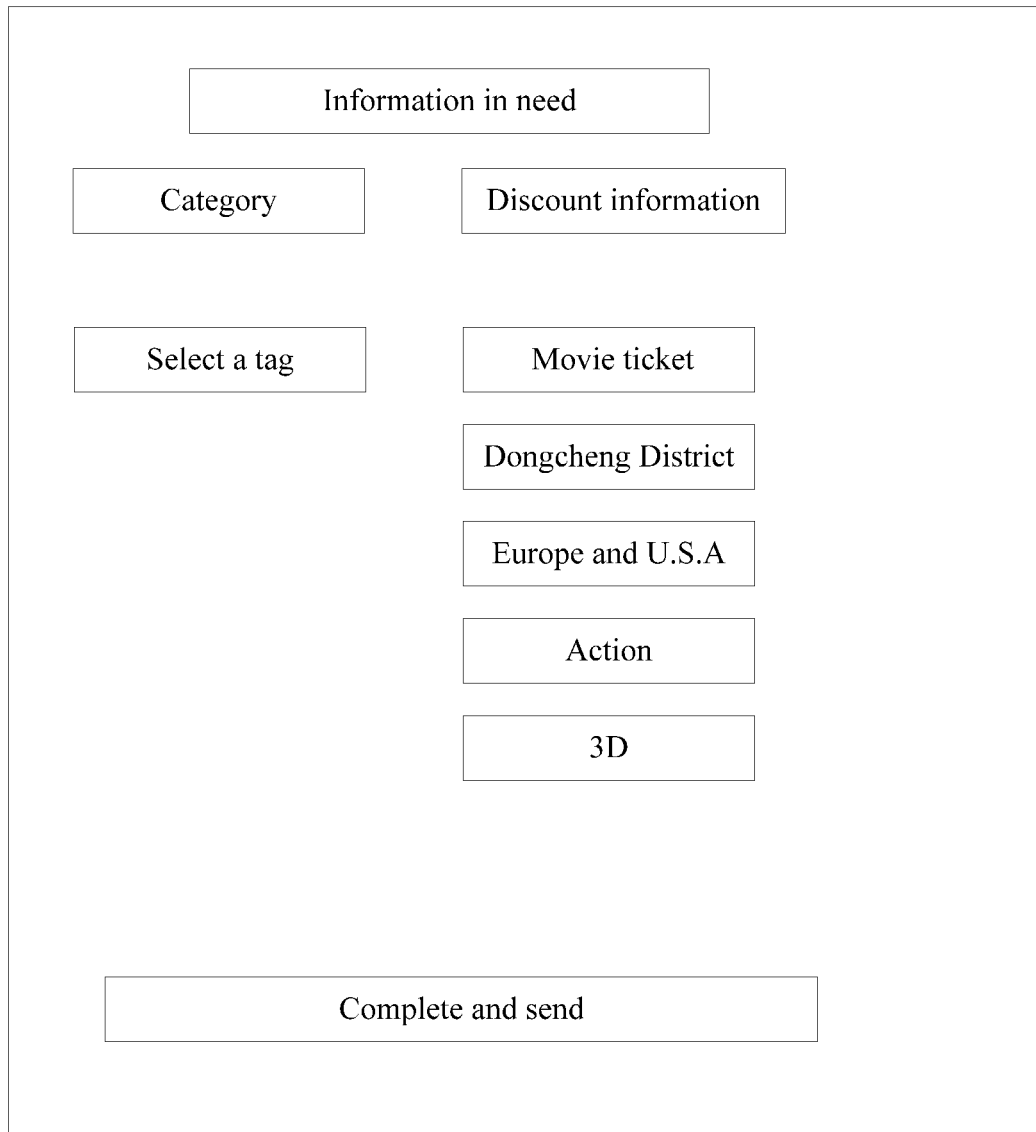
Figure 4:
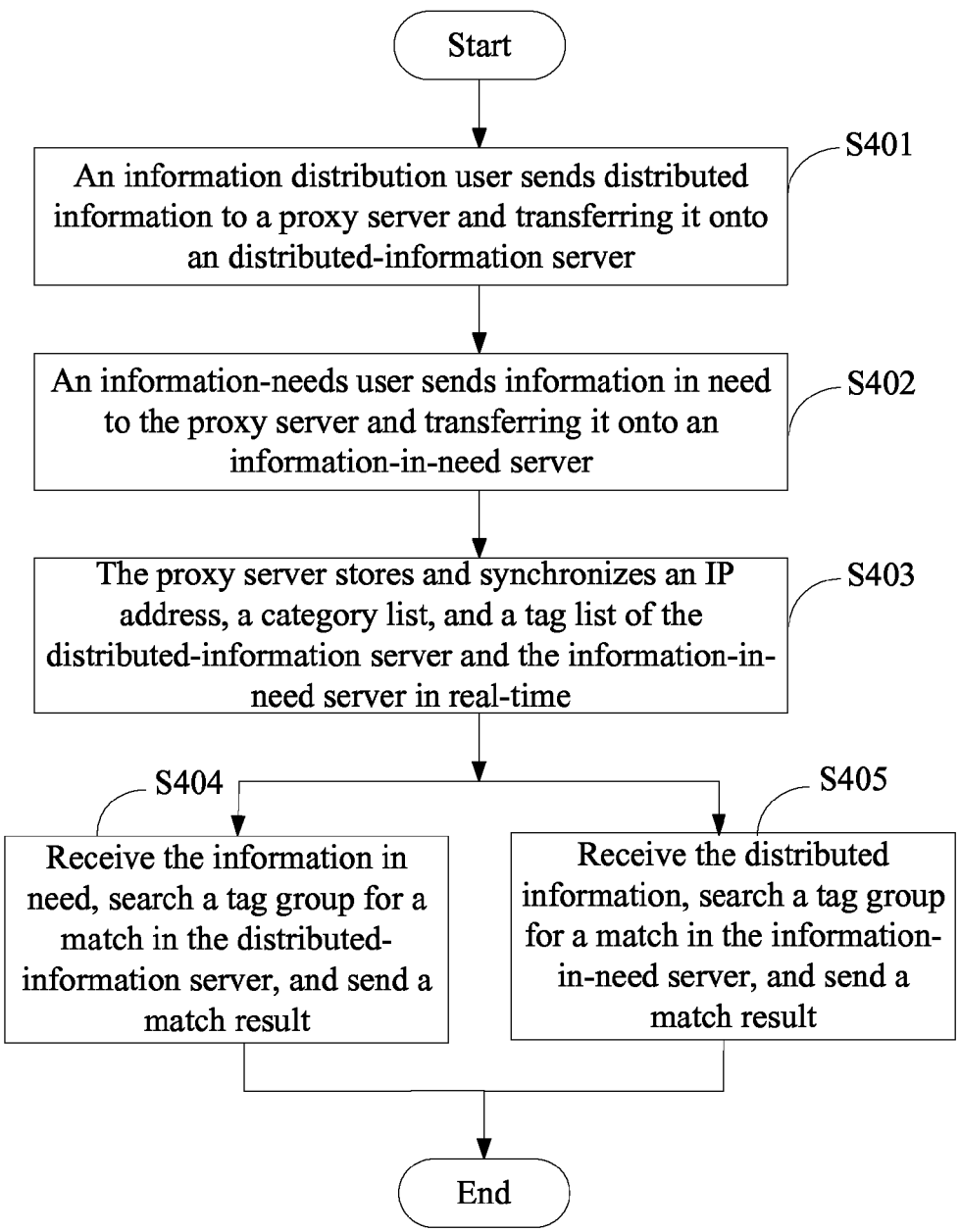

FIG. 1A and FIG. 1B illustrate a configuration of a distributed system server according to an embodiment of the present disclosure;

FIG. 2A to FIG. 2D views in which distributed information of a user terminal is set according to the embodiment of the present disclosure;

FIG. 3 illustrates a view in which information in need at the user terminal is set according to the embodiment of the present disclosure; and FIG. 4 illustrates a flow chart of a method for information distribution and instant information receiving according to an embodiment of the present disclosure.

DETAILED DESCRIPTION

Example embodiments will now be described more fully with reference to the accompanying drawings.

FIG. 1A and FIG. 1B illustrate a configuration of a distributed system server according to an embodiment of the present disclosure. The system server, together with user terminals, constitutes a network information service system. As shown in FIG. 1A and FIG. 1B, the system server includes at least one proxy server, at least one distributed-information server, and at least one information-in-need server. An information distribution user and an information-needs user send distributed information and information in need, respectively, to the proxy server through their respective user terminals. The distributed information includes a category and both of a tag and a data package under the category, which are selected from a category list and a tag list stored in the proxy server; and the selected tag forms a tag group, the data package includes at least a type of a text, an image, or a video. The information in need includes a category and a tag under the category, which are selected from the category list and the tag list stored in the proxy server; and the selected tag forms a tag group.

According to the category included in the distributed information, the system stores the distributed information into the distributed-information server that includes the category, where the distributed information is received via the proxy server. According to the category included in the information in need, the system stores the information in need into the information-in-need server that includes the category, where the information in need is received via the proxy server. The proxy server stores an IP address, the category list, and the tag list of the distributed-information server and the information-in-need server and consistently keeps them on with each proxy server. The distributed information and the information in need share the same tag list.

If the proxy server receives the information in need, the system searches in the proxy server for the IP address of the distributed-information server that includes the category, according to the category included in the information in need, and searches for the tag group included in the information in need in the distributed-information server. If there is a plurality of distributed-information servers that correspond to the category, the system searches for the tag group included in the information in need in the distributed-information servers. A controller sends the distributed information to the user terminal via which the information in need is sent, if the distributed information is searched out such that the tag group, which is included therein, completely or partially matches the tag group included in the information in need. If a plurality of pieces of the distributed information is searched out such that the tag group, which is included therein, completely or partially matches the tag group included in the information in need, the controller sends the plurality of pieces of the distributed information to the user terminal via which the information in need is sent.

If the proxy server receives the distributed information, the system searches in the proxy server for the IP address of the information-in-need server that includes the category, according to the category included in the distributed information, and searches for the tag group included in the distributed information in the information-in-need server. If there is a plurality of information-in-need servers that correspond to the category, the system searches for the tag group included in the distributed information in the information-in-need servers. A controller sends the distributed information to the user terminal via which the information in need is sent, if the distributed information is searched out such that the tag group, which is included therein, completely or partially matches the tag group included in the information in need. If a plurality of pieces of the information in need is searched out such that the tag group, which is included therein, completely or partially matches the tag group included in the distributed information, the controller sends the plurality of pieces of the distributed information to the user terminal via which the information in need is sent.

The completely matches indicates that all the tags of the tag group included in the distributed information are identical to the respective tags of the tag group included in the information in need, and the partially matches indicates that some of the tags of the tag group included in the distributed information are identical to the respective tags of the tag group included in the information in need.

Figure 2A:
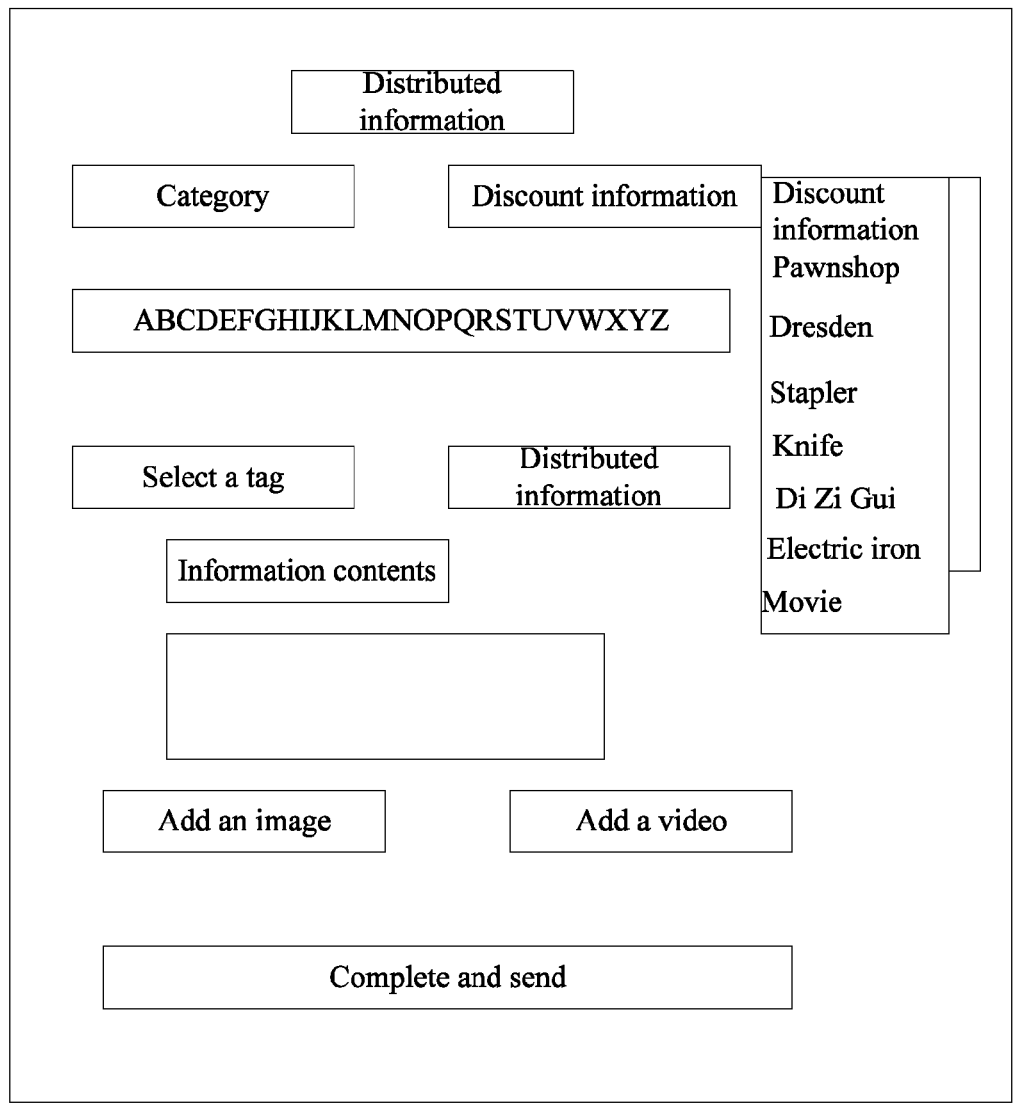
Figure 2B:
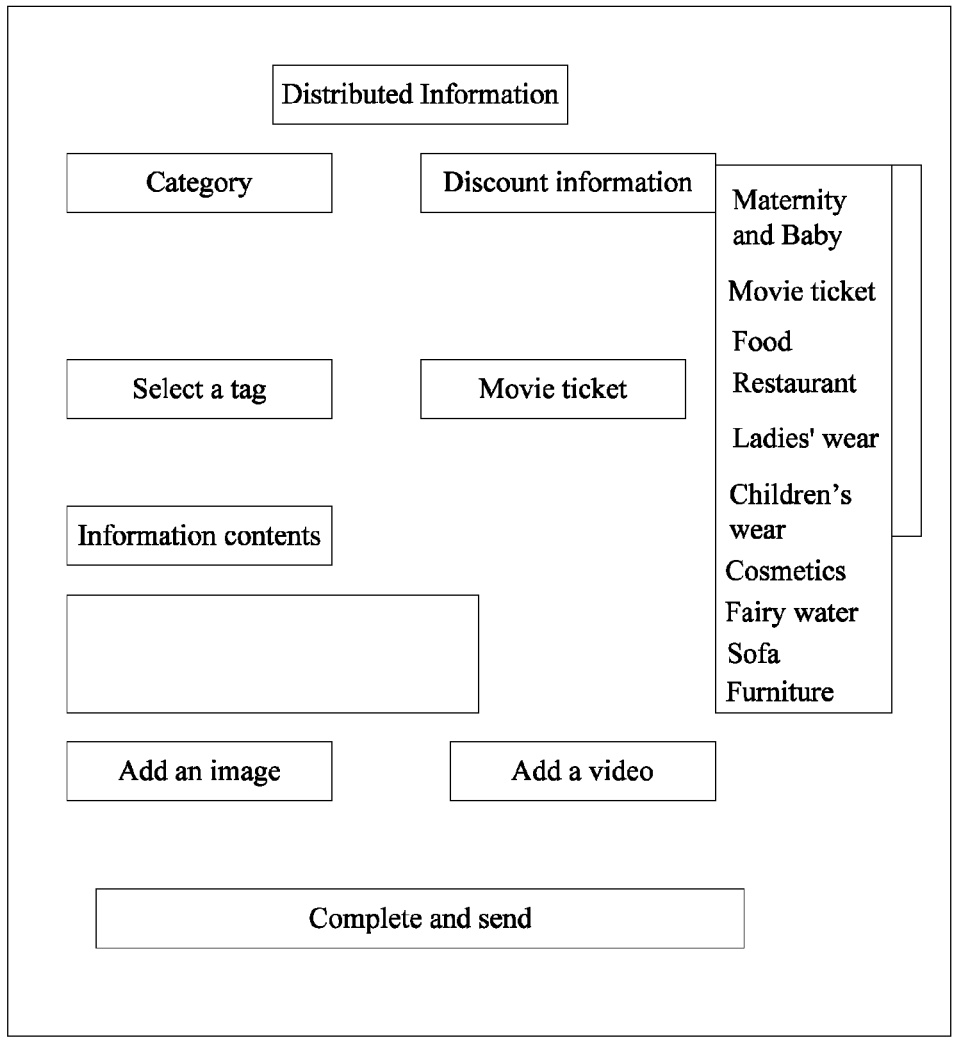
Figure 2C:
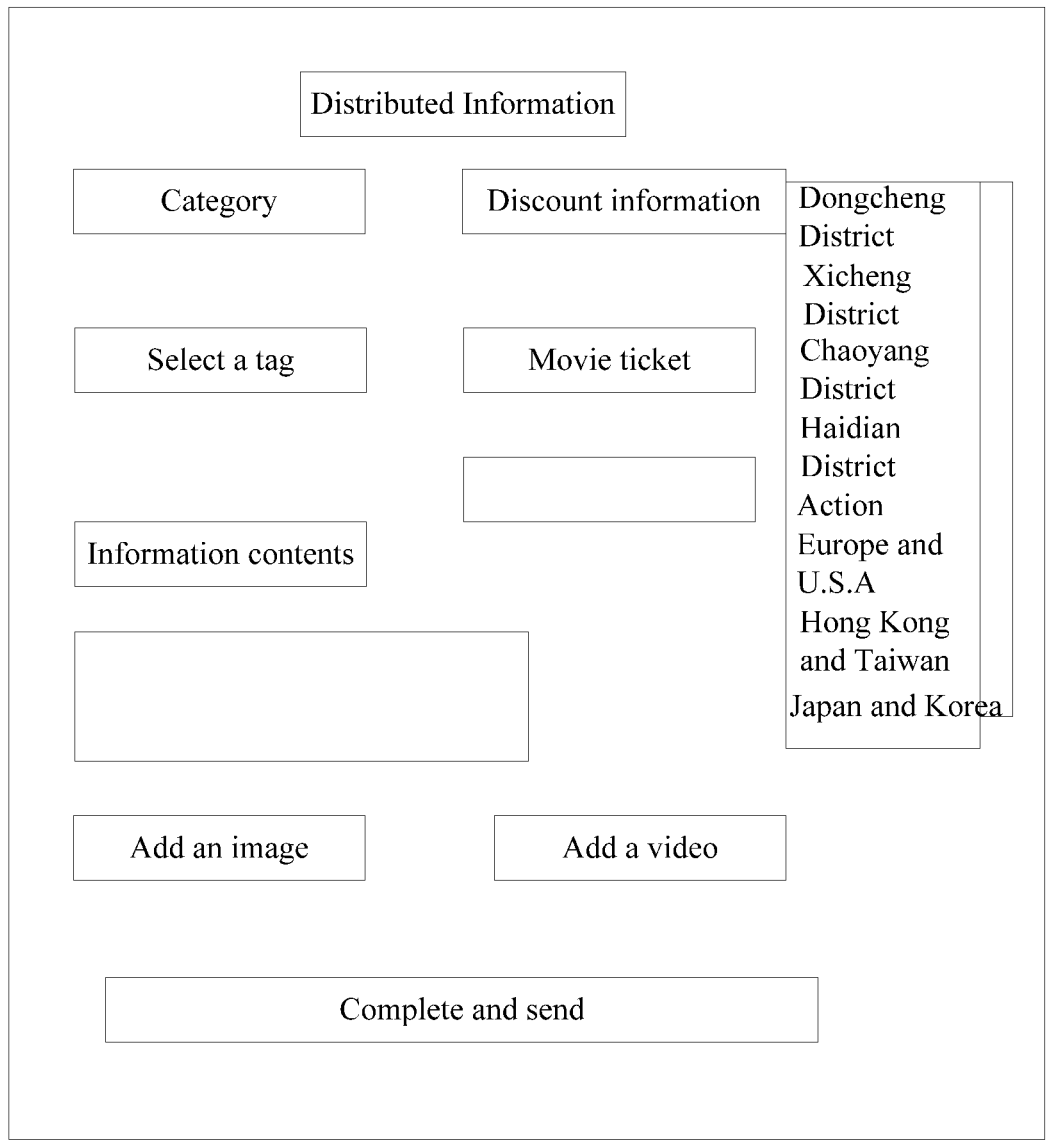
Figure 2D:
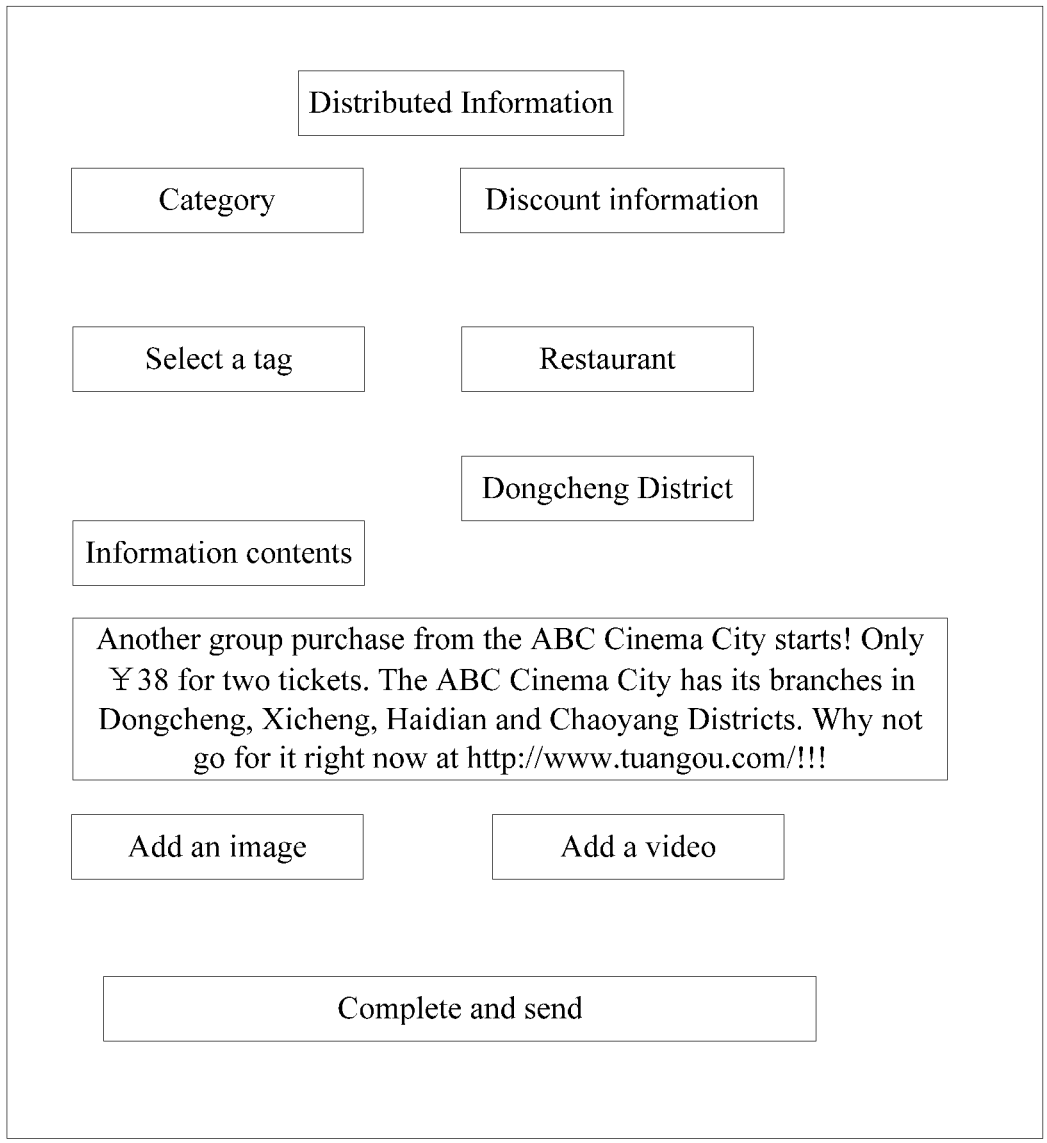

FIG. 2A to FIG. 2D illustrate views in which the distributed information at the user terminal is set according to the embodiment of the present disclosure. For example, the user terminal is a smartphone. Of course, alternatively, the user terminal can be a Personal Computer (PC), a laptop computer, a tablet computer, etc. As illustrated in FIG. 2A, if a user selects a category box, a category list next to the category box will be displayed. Using a scroll bar, the user can change a category displayed in the category list and can select a category in need. Alternatively, the category in need is displayed in the category list with a first letter, e.g., "D", entered by the user. Then the user can select the category in need in the category list, e.g., "Discount information". As illustrated in FIG. 2B, after the category is selected, if the user selects a tag box, a tag list corresponding to the selected category will be displayed next to the tag box. Using a scroll bar, the user can change a tag displayed in the tag list and can select a tag in need. Alternatively, the tag list in need is displayed in the tag list with a first letter, e.g., "C", entered by the user. The user can select the tag in need. As illustrated in FIG. 2C, after the tag is selected, the user can continue selecting a tag, thus resulting in a tag group. The user can enter into the tag box a tag absent in the tag list. Thereafter as illustrated in FIG. 2D, the user can enter an information content into an information content box, and can add an image or a video. After the above setting is made, the user can click on a "Send" button. Then the distributed information can be sent to the proxy server. The distributed information is normally timely information.

FIG. 3 illustrates a view in which the information in need at the user terminal is set according to the embodiment of the present disclosure. A setting of the information is similarly to a setting of the distributed information, except no added options regarding an information content, an image, and a video when setting the information in need for the user.

Preferably, the category in the category list is sorted by a first letter of a category name, and the tag in the tag list of each category is sorted by number of times the tag being selected in a descending order.

The system stores the distributed information and the information in need in storage areas of the distributed-information server and the information-in-need server, which correspond to the categories included in the distributed information and the information in need, respectively, upon receipt thereof via the proxy server.

If the proxy server receives the information in need, it forwards the information in need to the distributed-information server that includes the category in the information in need. Furthermore, the proxy server searches for the distributed information stored in the distributed-information server. The proxy server sends the distributed information to the user terminal via which the information in need is sent, if the distributed information is searched out such that the tag group, which is included in the same category, completely or partially matches the tag group included in the information in need.

If there is a plurality of distributed-information servers that includes the category included in the information in need, the distributed information stored in the plurality of distributed-information servers will be searched for. Furthermore, the distributed information is sent to the user terminal via which the information in need is sent, where the tag group of the distributed information included in the same category, which is search out, completely or partially matches the tag group included in the information in need.

If the system server receives the distributed information, the proxy server forwards the distributed information to the information-in-need server that includes the category in the distributed information. Furthermore, the proxy server searches for the information in need stored in the information-in-need server. The proxy server sends the distributed information to the user terminal via which the information in need is sent, if the information in need is searched out such that the tag group, which is included in the same category, completely or partially matches the tag group included in the distributed information.

If there is a plurality of information-in-need servers that includes the category included in the distributed information, the information in need stored in the plurality of information-in-need servers will be searched for. Furthermore, the distributed information is sent to the user terminal via which the information in need is sent, where the tag group of the information in need included in the same category, which is search out, completely or partially matches the tag group included in the distributed information.

The completely matches indicates that all the tags of the tag group included in the distributed information are identical to the respective tags of the tag group included in the information in need, and the partially matches indicates that some of the tags of the tag group included in the distributed information are identical to the respective tags of the tag group included in the information in need.

The category in the category list is sorted by a first letter of a category name, and the tag in the tag list of each category is sorted by times the tag being selected in a descending order.

After the category is selected and under which the tag in the tag list is selected by the information-needs user or the information distribution user on his or her user terminal, other tags in the tag list under the category are re-sorted by times the tags being selected in a descending order, under a condition that the tag in the tag list is selected.

FIG. 4 illustrates a flow chart of a method for information distribution and instant information receiving according to an embodiment of the present disclosure. The method includes the following steps:

S401: an information distribution user sends distributed information to a proxy server and transferring it onto a distributed-information server. In particular, S401 includes:

sending distributed information to a proxy server via one user terminal, by an information distribution user, where the distributed information includes a category and both of a tag and a data package under the category, which are selected from a category list and a present tag list stored in the proxy server; and the selected tag forms a tag group, the data package includes at least a type of a text, an image, or a video, and the distributed information is stored in one of the at least one distributed-information server according to the category.

S402: an information-needs user sends information in need to the proxy server and transferring it onto an information-in-need server. In particular, S402 includes:

sending information in need to the proxy server via another user terminal, by an information-needs user, where the information in need includes a category and a tag under the category, which are selected from the category list and the present tag list stored in the proxy server; and the selected tag forms a tag group, and the information in need is stored in one of the at least one information-in-need server according to the category.

S403: the proxy server stores and synchronizes an IP address, a category list, and a tag list of the distributed-information server and the information-in-need server in real-time. In particular, S403 includes:

storing, by the proxy server, an IP address, the category list, and the tag list of the distributed-information server and the information-in-need server and consistently keeping them on with each proxy server.

S404: receive the information in need, search for a tag group, look for a match in the distributed-information server, and send a match result. In particular, S404 includes:

searching in the proxy server for the IP address of the distributed-information server that corresponds to the category, according to the category included in the information in need, and searching for the tag group included in the information in need in the distributed-information server that corresponds to the category, if the proxy server receives the information in need; and sending the distributed information to the user terminal via which the information in need is sent, if the distributed information is searched out such that the tag group, which is included therein, completely or partially matches the tag group included in the information in need.

S405: receive the distributed information, search for a tag group, look for a match in the information-in-need server, and send a match result. In particular, S405 includes:

searching in the proxy server for the IP address of the information-in-need server that corresponds to the category, according to the category included in the distributed information, and searching for the tag group included in the distributed information in the information-in-need server that corresponds to the category, if the proxy server receives the distributed information; and sending the distributed information to the user terminal via which the information in need is sent, if the information in need is searched out such that the tag group, which is included therein, completely or partially matches the tag group included in the distributed information.

The completely matches indicates that all the tags of the tag group included in the distributed information are identical to the respective tags of the tag group included in the information in need, and the partially matches indicates that some of the tags of the tag group included in the distributed information are identical to the respective tags of the tag group included in the information in need.

The method is employed by a software installed on the system server and the user terminals. If the system server receives the tag list entered by the user in which there is no tag, the system server will automatically update the tag list on the user terminal. In addition, the system server will update the order of the tags in the tag list at the user terminal according to the times the tags are being selected.

Therefore, the present disclosure provides the users with "a facility that enables information in need for the users to be sent to them simultaneously when the information is distributed", and "a facility that enables information distributed by the users to be sent to those in need of it simultaneously when the information is distributed". Moreover, a distributed storage in the distributed system server for instant information push entails efficient running of the system, while some servers thereof are under attack. Hence, the system security is significantly improved.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for instant information push in a network information service, comprising:
   A. sending distributed information to a first proxy server of a plurality of proxy servers via a user terminal, by an information distribution user, wherein the distributed information comprises a category and one or more tags and a data package under the category, which are selected from a category list and a tag list stored in the first proxy server; and the selected tags form a tag group, the data package comprises at least a type of a text, an image, or a video, and the distributed information is stored in a storage area of a distributed-information server, which corresponds to the category comprised in the distributed information;
   B. sending information in need to a second proxy server of the plurality of proxy servers via another user terminal, by an information-needs user, wherein the information in need comprises a category and one or more tags under the category, which are selected from the category list and the tag list stored in the second proxy server; and the selected tags form a tag group, and the information in need is stored in a storage area of a information-in-need server, which corresponds to the category comprised in the information in need;
   C. storing, by each of the plurality of proxy servers, an IP addresses, the category lists, and the tag lists of all distributed-information servers and all information-in-need servers and consistently keeping them on with one another;
   D. searching in the second proxy server for the IP address of one or more distributed-information server that comprise the category, according to the category comprised in the information in need, and searching for the tag group comprised in the information in need in the one or more distributed-information servers that comprise the category, if the second proxy server receives the information in need; and sending one or more pieces of distributed information to the user terminal via which the information in need is sent, if the one or more pieces of distributed information are searched out such that the tag group, which is comprised therein, completely or partially matches the tag group comprised in the information in need; and
   E. searching in the first proxy server for the IP addresses of one or more information-in-need servers that comprise the category, according to the category comprised in the distributed information, and searching for the tag group comprised in the distributed information in the one or more information-in-need servers that comprise the category, if the first proxy server receives the distributed information; and sending the distributed information to the user terminals via which one or more pieces of information in need is sent, if the one or more pieces of information in need is searched out such that the tag group, which is comprised therein, completely or partially matches the tag group comprised in the distributed information;
   wherein the "completely matches" indicates that all the tags of the tag group comprised in the distributed information are identical to the respective tags of the tag group comprised in the information in need, and the "partially matches" indicates that some of the tags of the tag group comprised in the distributed information are identical to the respective tags of the tag group comprised in the information in need.

2. The method according to claim 1, wherein if the second proxy server receives the information in need and one or more pieces of distributed information is searched out in the one or more distributed-information servers that comprises the category comprised in the information in need such that the tag group, which is comprised therein, completely or partially matches the tag group comprised in the information in need, it sends the information in need to the user terminals via which the one or more pieces of distributed information are sent; and
   if the first proxy server receives the distributed information and one or more information in need is searched out in the one or more pieces of information-in-need server that comprises the category comprised in the distributed information such that the tag group, which is comprised therein, completely or partially matches the tag group comprised in the distributed information, it sends the one or more pieces of information in need to the user terminal via which the distributed information is sent.

3. The method according to claim 2, wherein the distributed information is timely information.

4. The method according to claim 2, wherein the categories in a category list are sorted by a first letter of a category name, and the tags in the tag list of each category are sorted by the number of times the tag being selected in a descending order.

5. The method according to claim 2, wherein after a category is selected and under which the one or more tags in the tag list are selected by the information-needs user or the information distribution user on his or her user terminal, other tags in the tag list under the category are re-sorted by the number of times the other tags being selected in a descending order, under a condition that the one or more tags in the tag list are selected.

6. The method according to claim 2, wherein the information-needs user and the information distribution user define one or more tag, and, if the defined one or more tags are absent in the present tag list, the defined tags are automatically added to the tag list.

7. The method according to claim 1, wherein the distributed information is timely information.

8. The method according to claim 1, wherein the categories in a category list are sorted by a first letter of a category name, and the tags in the tag list of each category are sorted by the number of times the tag being selected in a descending order.

9. The method according to claim 1, wherein after a category is selected and under which the one or more tags in the tag list are selected by the information-needs user or the information distribution user on his or her user terminal, other tags in the tag list under the category are re-sorted by the number of times the other tags being selected in a descending order, under a condition that the one or more tags in the tag list are selected.

10. The method according to claim 1, wherein the information-needs user and the information distribution user define one or more tag, and, if the defined one or more tags are absent in the present tag list, the defined tags are automatically added to the tag list.

11. A distributed system server for instant information push in a network information service, comprising at least one proxy server, at least one information-in-need server, and at least one distributed-information server, and the system further comprises:

sending distributed information to a first proxy server of the at least one proxy server via a user terminal, by an information distribution user, wherein the distributed information comprises a category and one or more tags and a data package under the category, which are selected from a category list and a tag list stored in the first proxy server; and the selected tags form a tag group, the data package comprises at least a type of a text, an image, or a video, and the distributed information is stored in a storage area of the at least one distributed-information server, which corresponds to the category comprised in the distributed information;

sending information in need to a second proxy server of the at least one proxy servers via another user terminal, by an information-needs user, wherein the information in need comprises a category and one or more tags under the category, which are selected from the category list and the tag list stored in the second proxy server; and the selected tags form a tag group, and the information in need is stored in a storage area of the at least one information-in-need server, which corresponds to the category comprised in the information in need;

storing, by each of the at least one proxy servers, an IP addresses, the category lists, and the tag lists of the at least one distributed-information server and the at least one information-in-need server and consistently keeping them on with one another;

searching in the second proxy server for the IP addresses of one or more distributed-information servers that comprise the category, according to the category comprised in the information in need, and searching for the tag group comprised in the information in need in the one or more distributed-information server that comprise the category, if the second proxy server receives the information in need; and sending one or more pieces of distributed information to the user terminal via which the information in need is sent, if the one or more pieces of distributed information is searched out such that the tag group, which is comprised therein, completely or partially matches the tag group comprised in the information in need; and searching in the first proxy server for the IP addresses of one or more information-in-need servers that comprise the category, according to the category comprised in the distributed information, and searching for the tag group comprised in the distributed information in the one or more information-in-need servers that comprise the category, if the first proxy server receives the distributed information; and sending the distributed information to the user terminals via which one or more pieces of information in need are sent, if the one or more pieces of information in need are searched out such that the tag group, which is comprised therein, completely or partially matches the tag group comprised in the distributed information;

wherein the "completely matches" indicates that each tag in the tag group comprised in the distributed information is identical to the respective tag in the tag group comprised in the information in need, and the "partially matches" indicates that not every tag in the tag group comprised in the distributed information is identical to the respective tag in the tag group comprised in the information in need.

12. The distributed system server according to claim 11, wherein if the second proxy server receives the information in need and one or more pieces of distributed information are searched out in one or more distributed-information servers that comprise the category comprised in the information in need such that the tag group, which is comprised therein, completely or partially matches the tag group comprised in the information in need, it sends the information in need to the user terminals via which the one or more pieces of distributed information are sent; and if the first proxy server receives the distributed information and one or more pieces of information in need are searched out in one or more information-in-need server that comprise the category comprised in the distributed information such that the tag group, which is comprised therein, completely or partially matches the tag group comprised in the distributed information, it sends the one or more pieces of information in need to the user terminal via which the distributed information is sent.

* * * * *